United States Patent [19]
Ketting et al.

[11] Patent Number: 5,829,850
[45] Date of Patent: Nov. 3, 1998

[54] CRAWLER CHAIN FOR TRACKED VEHICLES

[75] Inventors: Michael Ketting, Ennepetal; Mathias Woydt, Berlin; Wolfgang Kunkel, Hagen; Friedrich Böttger, Haan; Karl-Friedrich Fischer, Kirchberg, all of Germany

[73] Assignee: Intertractor Aktiengesellschaft, Gevelsberg, Germany

[21] Appl. No.: 838,326

[22] Filed: Apr. 8, 1997

Related U.S. Application Data

[63] Continuation of Ser. No. 433,361, filed as PCT/DE93/01171, Dec. 4, 1993, abandoned.

[30] Foreign Application Priority Data

| Dec. 11, 1992 | [DE] | Germany | 42 41 774.0 |
| Mar. 12, 1993 | [DE] | Germany | 43 07 898.0 |
| May 8, 1993 | [DE] | Germany | 43 15 355.0 |
| Aug. 26, 1993 | [DE] | Germany | 43 28 701.8 |

[51] Int. Cl.$^6$ ............................................. B62D 55/18
[52] U.S. Cl. .................... 305/194; 305/103; 305/197; 305/203
[58] Field of Search ........................ 305/192, 193, 305/194, 195, 196, 197, 202, 203, 103; 264/362

[56] References Cited

U.S. PATENT DOCUMENTS

| 3,492,054 | 1/1970 | Boggs et al. | 305/103 |
| 3,504,562 | 4/1970 | Hirych | 74/243 |
| 3,941,903 | 3/1976 | Tucker, Jr. | 427/190 |
| 3,975,568 | 8/1976 | Rudness | 428/329 |
| 4,004,937 | 1/1977 | Masaki | 106/59 |
| 4,022,072 | 5/1977 | Chagawa et al. | 74/243 R |
| 4,025,351 | 5/1977 | Masaki | 106/59 |
| 4,042,282 | 8/1977 | Haslett et al. | 305/194 |
| 4,066,302 | 1/1978 | Baylor | 305/11 |
| 4,114,467 | 9/1978 | Petershack | 305/194 X |
| 4,332,573 | 6/1982 | Uchida et al. | 474/94 |
| 4,349,234 | 9/1982 | Hartmann | 305/194 |
| 4,354,990 | 10/1982 | Martinengo et al. | 264/65 |
| 4,407,551 | 10/1983 | Baylor | 305/197 |
| 4,438,981 | 3/1984 | Harms | 305/14 |
| 4,472,164 | 9/1984 | Pusch et al. | 474/161 |
| 4,582,366 | 4/1986 | Burfield et al. | 305/11 |
| 4,594,846 | 6/1986 | Livesay et al. | 59/5 |
| 4,743,571 | 5/1988 | Steinmann et al. | 501/97 |
| 4,819,999 | 4/1989 | Livesay et al. | 305/11 |
| 5,134,097 | 7/1992 | Niihara et al. | 501/92 |
| 5,183,318 | 2/1993 | Taft et al. | 305/39 |
| 5,303,992 | 4/1994 | Grainger | 305/46 |
| 5,374,115 | 12/1994 | Ketting | 305/11 |
| 5,393,134 | 2/1995 | Oertley | 305/57 |

FOREIGN PATENT DOCUMENTS

| 1145567 | 10/1957 | France | 305/192 |
| 2395439 | 2/1979 | France | 305/192 |
| 1562212 | 5/1990 | U.S.S.R. | 305/194 |

*Primary Examiner*—Russell D. Stormer
*Attorney, Agent, or Firm*—Herbert Dubno; Andrew Wilford

[57] ABSTRACT

A track system for a track vehicle which has a crawler chain and a driving sprocket wheel. The chain has links each of which has a pin assembly with a bushing or one piece bolt the outer periphery of which at least is composed of a material consisting of $Si_3N_4$ silicon nitride or a zirconium oxide with at most 15% of sintering additives. The driving sprocket wheel can have segments formed with the teeth and bolted to a disk, the segments being composed of a material consisting of $Si_3N_4$ silicon nitride or zirconium oxide with less than 15% of sintering additives.

12 Claims, 17 Drawing Sheets

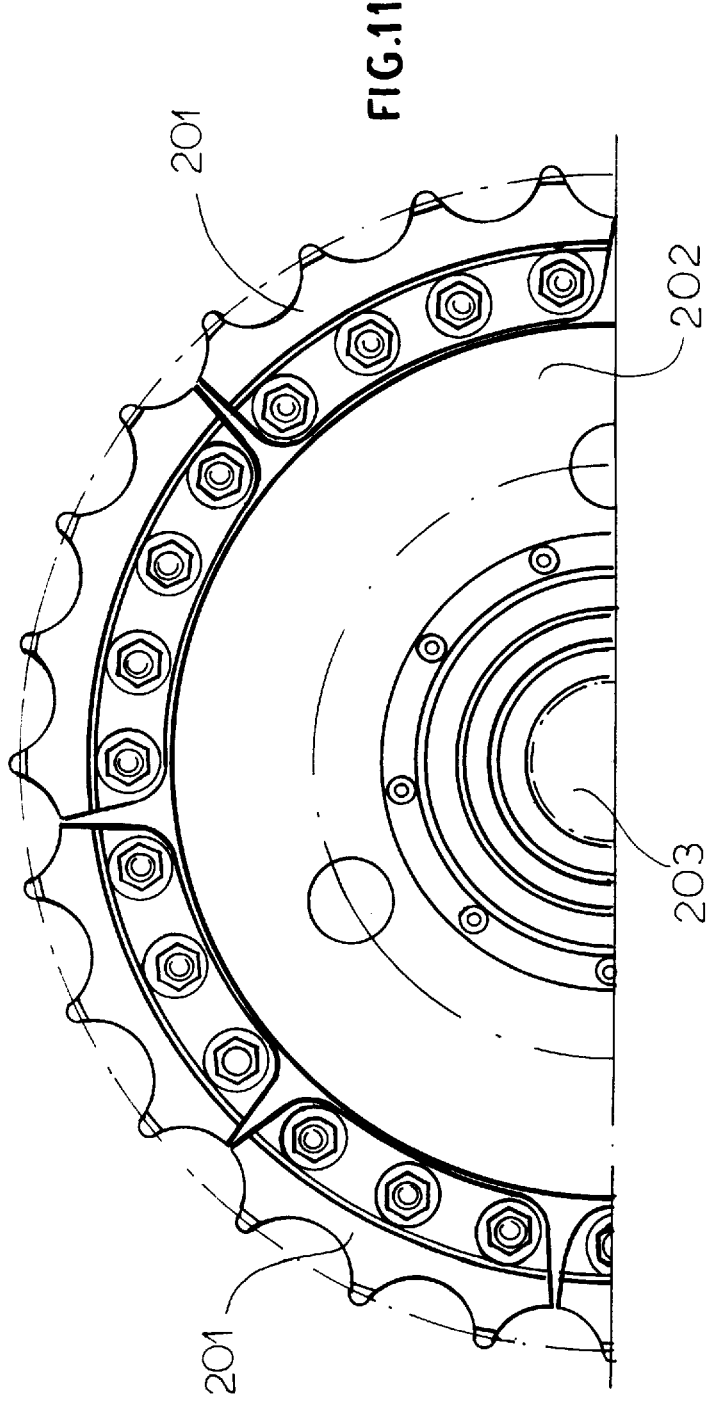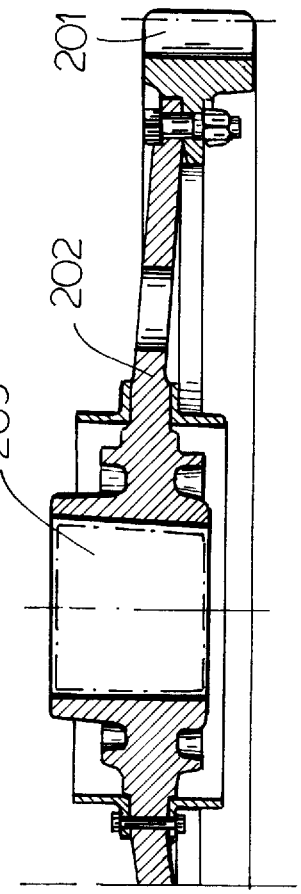

CRAWLER CHAIN FOR TRACKED VEHICLES

This application is a file-wrapper continuation of U.S. patent application Ser. No. 08/433,361 (now abandoned) filed 1 May 1995 as the U.S. national phase of PCT application PCT/DE93/01171 filed 4 Dec. 1993 and based, in turn, upon German national applications P 42 41 774.0 of 11 Dec. 1992, P 43 07 898.0 of 12 Mar. 1993, P 43 15 355.0 of 8 May 1993 and P 43 28 701.8 of 26 Aug. 1993, under the International Convention.

FIELD OF THE INVENTION

The invention relates to a crawler chain for tracked vehicles, particularly chain-driven construction vehicles. The invention relates, more particularly, to a crawler chain consisting of chain bushings, chain bolts and chain links made of steel, whereby the inner chain link ends are pressed onto the chain bushing, the outer chain link ends are pressed onto the chain bolt ends projecting beyond the bushing and the chain bushing is traversed by the chain bolt.

BACKGROUND OF THE INVENTION

Up to now all components of the crawler chain were usually made of steel. In this type of crawler chain considerable wear occurs particularly of the chain bushing in the area between the chain bolt and the chain bushing, as well as in the outer area of the chain bushing between the inner chain link ends which are pressed onto the bushing. In order to reduce the wear between the chain bushing and the chain bolt the use of lubricated or greased chains is known. However reduction of the wear in the outer area of the chain bushing which lies between the inner chain links has not yet been mentioned in the art.

OBJECT OF THE INVENTION

The object of the invention is to provide a crawler chain as described, which is less prone to wear or is subject to less wear than the presently used crawler chains.

SUMMARY OF THE INVENTION

For this purpose the invention provides that the chain bushing be made of hard metal, fiber composites, engineering ceramics and/or preferably ceramic—ceramic composite materials based on $Si_3N_4$ (silicon nitride) with less than 15% by weight of sintering additive. As a result a chain bushing is created which is minimally prone to wear. Particular attention has to be paid to the selection of the material for the production of the bushing, so that the break growth of the material remains at a subcritical level. The Weibull module is smaller than 20%. The strength and the tenacity have to be adjusted to an optimal value in crawler chains for each concrete application through the selection and dosage of appropriate additives, whereby special attention has to be paid to the homogeneity of the bushing material.

Due to this construction a reduction of link wear, especially of the bushing wear is achieved, whereby in the case of lubricated or greased chains this advantage relates exclusively to the outer bushing wear, while in the case of dry chains the outer bushing wear as well as the inner link wear, are reduced. Even in the case of lubricated or greased chains which no longer contain any lubricant or grease due to sealing deficiencies, a reduction of wear is insured when such chains continue to operate.

It is especially advantageous when the press fit between the chain link and the chain bushing in relation to a required tolerance field of the bore of the chain link constituting the bushing eye and a tolerance field of the outer diameter of the chain bushing are selected so that based on the lower expansion coefficient of the chain bushing in comparison to the steel in the press fit with the steel material of the chain link a fit is created which insures pressure as a result of elastic deformation.

The construction of the invention makes possible the production of the usual, up to now dry-sealed chain links, wherein a quasi sealing occurs by means of disk springs between the chain link and the bushing. Also dry chains wherein the link is devoid of any sealing or lubrication, have a considerably longer life, whereby the wear reduction creates the possibility to eliminate the greased or lubricated chains with a sealing, because of the longevity of such chains achieved according to the invention.

The invention relates further to a crawler chain which has chain bolts with axial blind recesses and radial throughgoing recesses, which are filled with an oil or grease-like lubricant and whose axial blind recesses can be closed off at their open end by appropriate closing means, whereby between the chain bolt and chain bushing a lubrication gap is formed which is closed off axially on the outside by sealing means. These sealing means can be arranged between the frontal side of the chain bushing and the corresponding surface of the outer chain link. In such crawler chains it is considered particularly advantageous when the sealing means consist of a) an elastic sealing (sealing ring) and an inner support ring radially arranged thereto, preferably made of a bushing material as described, whereby the support ring is a separate part or is formed on the chain bushing (molding 15), b) a sliding ring created by the frontal bushing side and formed thereon and a sliding ring seal made of the same material and provided with elastic spring means which rest axially opposite to the frontal face of the bushing on portions of the outer chain link, which is pressed against the slide ring until contact is made.

This construction makes it possible to construct sealed chains as before, which are filled with the usual, as well as optionally special lubricating or sliding means appropriate for the selected materials, including hydrodynamic lubricant. The link bolt can be designed as a hollow bolt with a blind bore and a transverse connection and the lubrication gap is provided with corresponding seals between the link, the bolt and the support ring. A construction with a sliding ring is also possible in the indicated manner.

In greased chains of usual construction the bolt is a solid bolt, but even this construction type is advantageous when the above-mentioned materials are used.

In a preferred further development, the chain bolt is made of the bushing material previously described.

A combination of ceramic bushing and ceramic bolt is particularly advantageous in dry chains (chain links), since only in such chains an inner chain link wear between bushing and bolt occurs. Although the wear advantage appears particularly good in a frictional combination between ceramic/steel, a wear reduction in the inner area can also be expected in a frictional combination ceramic/ceramic, particularly then when between the corresponding surfaces of ceramic bolt and ceramic bushing appropriate lubricants are lodged.

In this construction it is advantageous to make sure that the press fit between chain bolt and chain link occurs according to the tolerance conditions described.

In a further development it is proposed that the chain bushing be made of hard metal, fiber composites, ceramic— ceramic composite materials and/or engineering ceramics based on $Si_3N_4$ (silicon nitride) with less than 15% by weight of sintering additives, a fracture growth in the subcritical range, a fracture toughness of less than 20 MPa √m and higher homogeneity of the material by achieving a Weibull modulus of over 10, preferably over 20.

Advantageously the surfaces as well as the frontal (end) surfaces of the bushings can be machined, corresponding to the demands made on the bushing materials with regard to the wear behavior and the realization of a press fit, but advantageously are not machined in the area of tooth engagement, optionally in the bore as well as frontal (end) surfaces, which means that particularly in these surfaces the roughness (without further finishing), created in the course of usual technical processing of pressing, hot pressing, sinter pressing, sintering, gas pressure sintering and the like of the bushing materials are tolerated.

In the heretofore used metal bushings a finishing and a narrow tolerance were always required, which was costly and therefore disadvantageous. The construction of the invention offers a cost—efficient and lasting solution.

Advantageously the bushing is a pivot bushing, whereby the pivot bushing is constructively laid out so that, by taking into consideration the construction of the driving wheel and idler of a chain drive, respectively a chain guide, the diameter of the bushing corresponds to the optimal strength requirements regarding the use of the bushing materials. The surface roughness of the bushing in the pivot area or the tooth engagement area corresponds to the surface roughness of the earlier bushings, but preferably can be a roughness produced by pressing, hot pressing, sinter pressing, sintering or gas pressure sintering or any other similar technology for the bushing materials used. This roughness is thus tolerated according to the requirements of these production processes or the corresponding materials, without any further machining, whereby the radii in the transition area between the pressing area of the bushing and pivot are selected so that an optimal strength geometry corresponding to the requirements of the bushing materials is achieved. Preferably the radius R=3 mm to 8 mm.

Such pivot bushings per se are known to the state of the art. In the heretofore used pivot bushings the problem of wear is the reason for providing the additional pivot, which as a rule has a relatively reduced height. When the material according to the invention is used, a greater height has to be selected, so that a corresponding durability and strength are achieved.

Preferably it is further provided that the chain link is designed so that the bushing and the bolt in the heretofore used constructions are joined as one part, namely a compact bolt, consisting of steel, but preferably of one of the bushing materials and the hinging is made possible by a loose fit between the eye of the chain link lying on the inside of the link joint and the compact bolt.

The invention also provides a driving wheel base disk with driving wheel segments for the driving of crawler chains, conveyor chains and similar driving systems.

Usually such driving wheel base disks or also complete driving wheels are provided with different numbers of drive sprockets made of steel or cast iron, for driving crawler chains, preferably for the use in chain-driven vehicles for construction, agriculture and forestry, as well as special machines for road construction and other fields of industry, in conveyor chains and similar driving systems. Up to now, for this purpose, driving wheel segments have been screwed onto a drive wheel base disk, e.g. a flanged wheel, a screw-on rim or a welding ring, which were connected with the transmission shaft or the driving shaft. There are also constructions wherein complete driving wheel rims or complete driving wheels are inserted, whereby the driving wheel base disk and the drive sprockets are made in one piece.

Usually up to now such driving wheel segments or even complete driving wheels were made of steel, preferably tempered steel or cast iron, preferably spheroidal graphite iron. In practice the use of driving wheels results in considerable wear (abrasion factor) especially in the area where the chain bushing engages the teeth of the driving wheel or driving wheel segment.

The invention also creates a driving wheel or driving wheel segment which is only minimally prone to wear or is subject to a minimal abrasion factor.

In this case the entire driving wheel segment or the teeth of the segment or parts of the segment teeth can be made of hard metal, fiber composites, ceramic—ceramic composite materials and/or engineering ceramics or heavy-duty ceramics, preferably consisting of wear-resistant iron-based sintered materials, especially with a preferred wear-inducing protective coating and a starting powder of ferrochromium and iron as matrix materials and boron carbide as a hard-material phase, or of zirconium oxides or on the basis of nonoxidic ceramic, e.g. $Si_3N_4$ (silicon nitride), with less than 15% by weight of sintering additive, whereby the fracture propagation remains during the entire duration of operation in the subcritical range, the resistance to fracture $K_{Ic}$ does not fall below a value of 5 MPa m and the strength and tenacity are set at a defined level by use and dosage of appropriate additives, whereby especially the homogeneity of the material is insured and that the dispersion of the material characteristics, particularly of the strength through the Weibull module m of bigger than 10, preferably bigger than 20, have been defined. These materials can be referred to also as driving wheel materials.

The constructive layout is at least partially adjusted to the strength requirements (strength, tenacity, homogeneity) of the indicated materials. It is also possible to use inserts of the above driving wheel materials in or on substrate bodies made of steel or cast iron, with the latter having special designs for the introduction of the insert material.

Due to the construction of the invention a driving wheel segment or driving wheel with lesser wear is created.

The invention can be applied to the heretofore known common constructive designs. However in the construction of driving wheel segments a segment size of one to three teeth is preferred, since such a segment is more apt to do justice to the specific properties of the material. Up to now in the state of the art segment sizes of three to five and in special cases even up to 14 teeth have been common.

As a result of the choice of material the possibilities of the screw-on connections are increased in number, as well as the constructive layouts of the execution of this connection in the toothed segment itself and also of its counterpart (driving wheel base disk) are adapted to the concrete strength requirements of the material according to the invention.

The chain bushing, made of hard metal, fiber composites, engineering ceramics and or of ceramic—ceramic composite materials based on $Si_3N_4$ (silicon nitride) with less than 15% by weight of sintering additive and with the chain link made of steel, in the hinging area between the outer bolt contour (inner bushing surface) the construction is laid out so that the inner contour of the bushing comes close to the bolt contour resulting from the bending of the bolt when the chain is under load.

Further it is advantageously proposed that the inner contour area of the bushing in relation to the end openings of the bushing or also in relation to the area from the bushing middle to the bushing ends (frontal side of bushing) is close to a basically constant, nonlinear function, a function preferably predetermined by the bending lines of the bolt, this especially in relation to the bolt viewed a one-sided (centrally) held rod, analytically in the form $$y = K\left(1 - \frac{3x}{2l} + \frac{1x^3}{2l^2}\right)$$

or when viewed as a two-sided held bolt in the form $$y = K^*\left(\frac{x^3}{l^3} + \frac{4x^2}{3l^2}\right)$$

whereby K and K* are factors which result from the acting force, as well as specific values for materials and dimensions and l corresponds to the entire or half length of the bolt.

It is also possible to provide that, depending on the concrete case of use and the manufacturing possibilities, other functions can be realized, such as a contour shaped like a compound arched curve, with different radii, a potential function, an exponential function or a logarithmic function.

Due to the proposals of the invention, the design of the inner contour of the chain bushing following the bending lines of the bolt, respectively according to proposed nonlinear functions, does justice to a special extent to the construction of the bushing with the proposed materials, since they have an expansion coefficient different from steel.

If for instance the bushing is made of the preferred bearing materials and the bolt is made of steel, then as a result of the lower expansion coefficient of the bushing material a higher degree of bending occurs in the bolt than in the bushing, a fact which leads to contact between bushing and bolt with the possible risk of breaks at the bushing rim, which can considerably impair the functioning capability of the chain.

The state of the art provided known technical solutions for bushings made of steel, whereby the inner contour of the bushing is such that a deviation from the originally straight area (in the middle section) takes place, whereby this deviation itself follows a straight line.

This solution has merely the advantage that when the chain links are pressed against it, the basically straight original inner contour becomes again a straight line after pressing, due to the inwardly transmitted effects of the press fit. An adjustment to the bending of the bolt when the chain is under load, such as offered by the present invention, is not achieved by this solution. Besides in the case of linear deviations there are limits with respect to the size of the deviation, since when the inner contour follows an excessively inclined line, the deflection (in relation to the length of the chain) necessary for the chain to function can not be accurately maintained.

In the solution proposed by the invention, the dimensioning according to the chain load in various chain types can be optimally established, in that a direct adjustment of the nonlinear inner bushing contour to the bolt takes place, whereby the problem of the chain amplitude can be improved.

Starting out from this problem point the substance of the invention can also be applied to chains wherein the bushings are not equipped with the preferred materials, i.e. also to chains with steel bushings.

BRIEF DESCRIPTION OF THE DRAWING

The above and other objects, features, and advantages will become more readily apparent from the following description, reference being made to the accompanying drawing in which:

FIG. 11 is a partial end view of a chain driving wheel segment with a driving wheel base disk;

FIG. 11a is a section of the segment;

SPECIFIC DESCRIPTION

Figure 1:
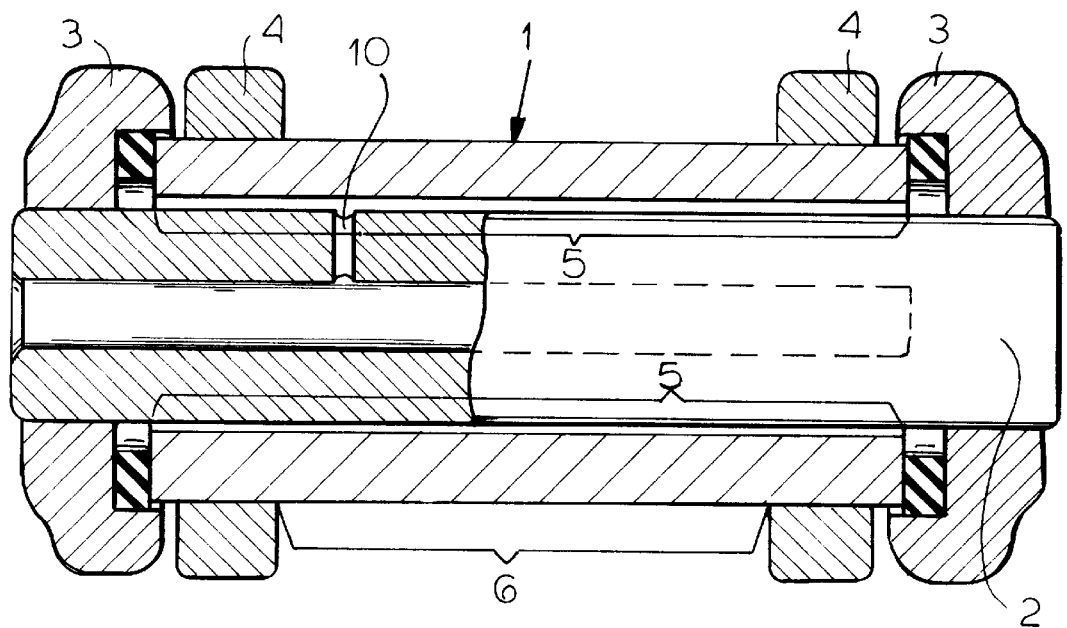
FIGS. 1 to 5 are sectional views of various crawler chain configurations.
Figure 2:
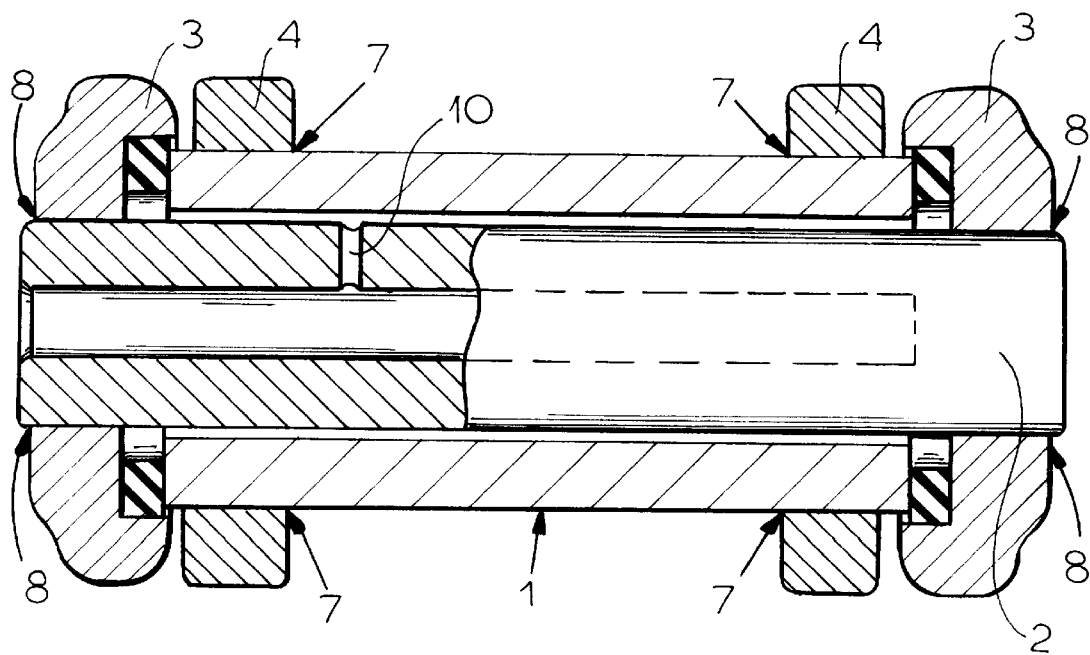

FIGS. 1–10 and 26–27 a chain link assembly of a crawler chain for chain-driven vehicles is shown, which consists of a chain bushing 1, chain bolt 2 forming a pin assembly with the bushing and chain links 3, 4, whereby the inner chain link ends of the chain links 4 have holes which are pressed onto the chain bushing 1, while the outer chain link ends of the chain links 3 are also perforated and are pressed onto the chain bolt ends of the chain bolt 2 projecting beyond the bushing 1. The chain bolt 2 is coaxially surrounded by the chain bushing 1. In the embodiments according to FIGS. 1 to 4 the chain links 3, 4 and the chain bolt 2 are made of steel, while the chain bushing 1 is preferably made of ceramic—ceramic composite materials based on $Si_3N_4$. In the embodiment according to FIG. 5 the chain bolt 2 is also made of such ceramic—ceramic composite materials.

The chain bushings 1 are subjected to considerable wear primarily in two areas, namely area 5 representing the internal abrasion between bushings and bolts and in the tooth meshing area 6, which is the outer area of bushing 1. This wear is minimized in oil-filled, as well as greased and also in dry chain links, as long as according to the invention the chain bushing 1 is made of the indicated material. In lubricated chains the wear advantage due to the use of the corresponding chain bushing 1 is evident especially in the outer area 6, while in dry chains according for instance to FIG. 4 a wear reduction can be found in the inner area 5 as well as in the outer area 6.

In the areas 7 and 8 a press fit is achieved between the inner links 4 and the bushing 1, respectively between the outer links 3 and the bolt 1, in order to keep the link construction together. The press fit between the chain links 4 and the bushing 1 in all embodiments and also the press fit between chain link 3 and the bolt 2 in the embodiment according to FIG. 5 has to be optimized with respect to the required tolerance field of the bore (bushing eye of the chain link) and the tolerance field of the outer diameter of the bushing, respectively the bolt, so that based on the lower expansion coefficient of the bushing or bolt made of the material of the invention (in relation to steel) in conjunction with the material of the chain link 3 or 4, a fit results which insures a pressure due to elastic deformation.

Figure 3C:
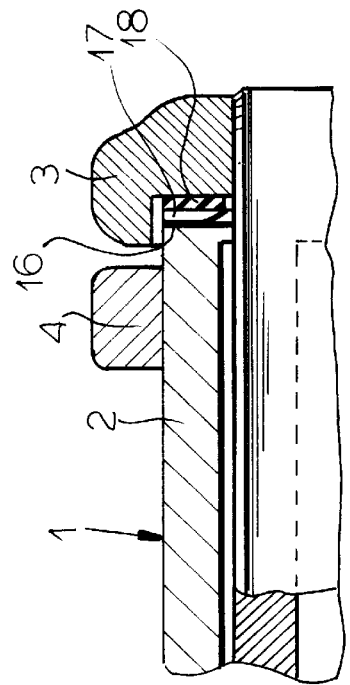
Figure 3D:
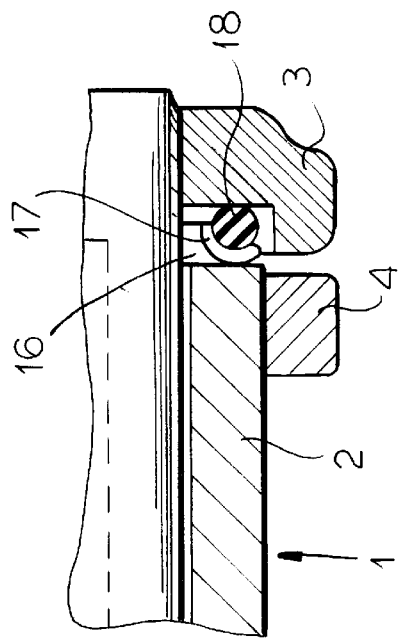
Figure 3A:
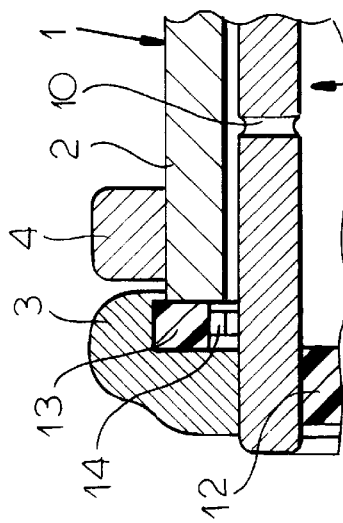
Figure 3B:
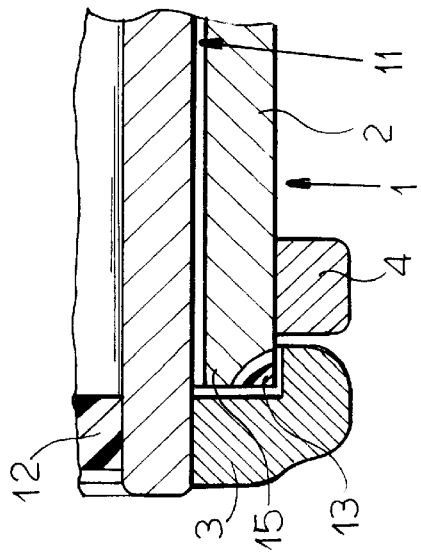

This construction can be used in producing sealed chains of the traditional kind (compare FIGS. 3a–3d) whereby the traditional, as well optionally special lubricating and gliding means suitable to the indicated materials, including hydrodynamic lubricants, can be introduced in the chain link. For this purpose the link bolt 2 has an axial blind bore 9 and a cross-channel 10, so that the lubricant can penetrate from the blind bore 9 through the hollow space 10 and reach the lubrication gap 11. The sealing of the lubricant reservoir of bolt 2 takes place for instance by means of an elastic plug 12. The outer sealing is done by a seal 13 and a support ring 14 (FIG. 3a) or a seal 13 and a support area 15 (FIG. 3b).

The seal can also consist of a sliding ring 16 formed on the bushing 1 and a counterpiece 17 made of the same material, which is axially held under preliminary stress by an elastic rubber seal 18. This is shown in FIG. 3c or 3d. In the case of greased chains the joint can consist of a bolt 2 of solid material and seals between chain link 3 and bushing 1, whereby a similar configuration to the one in FIGS. 3a–3d can be used.

Figure 4:
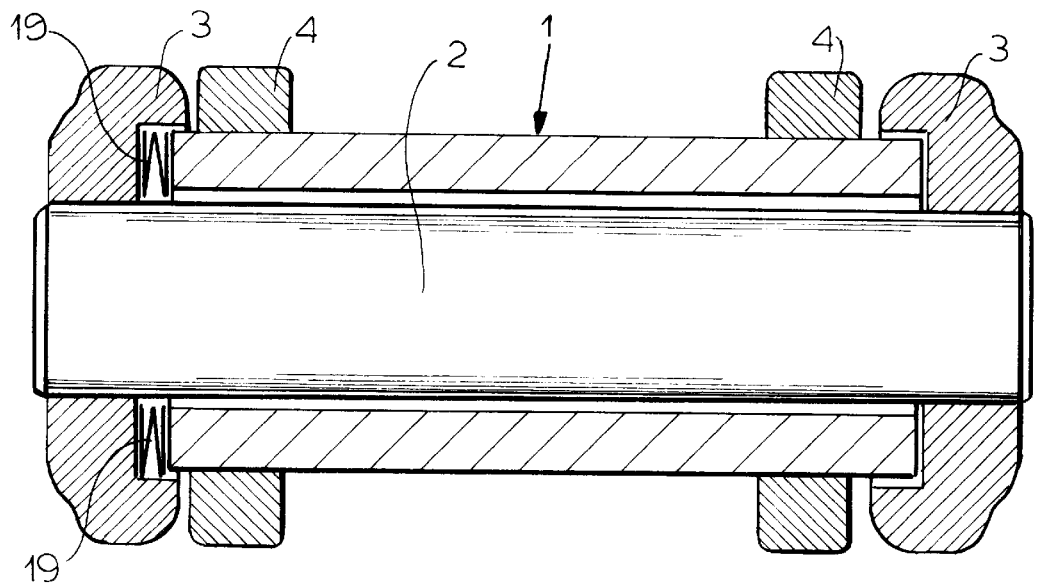

In common dry-sealed chain links, as for instance shown in FIG. 4, as a quasi-seal an axial arrangement of spring disks 19 is provided between the frontal surface of the bushing 1 and the chain link 3.

In dry chains without any seals (compare FIGS. 4 and 5 right) a particularly simple construction of the link connection is made possible, whereby due to the use of the indicated materials it is still possible to achieve an advantageous wear behavior.

Figure 5:
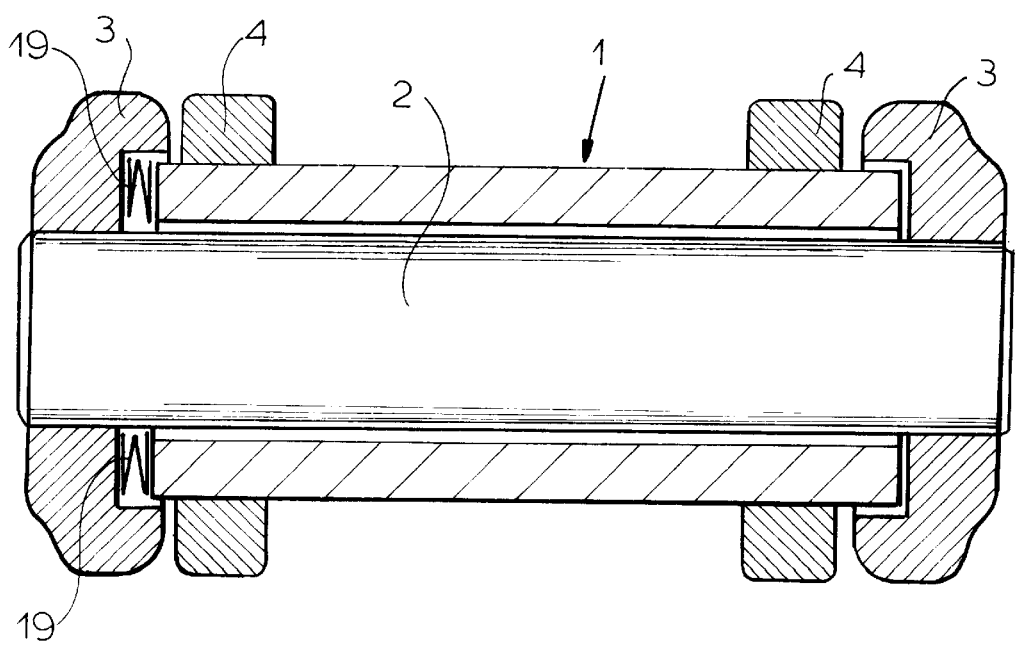

In the embodiment according to FIG. 5 the bolt 2 is also made of the above-mentioned material, the same of which the bushing 1 is made according to the invention.

Figure 6:
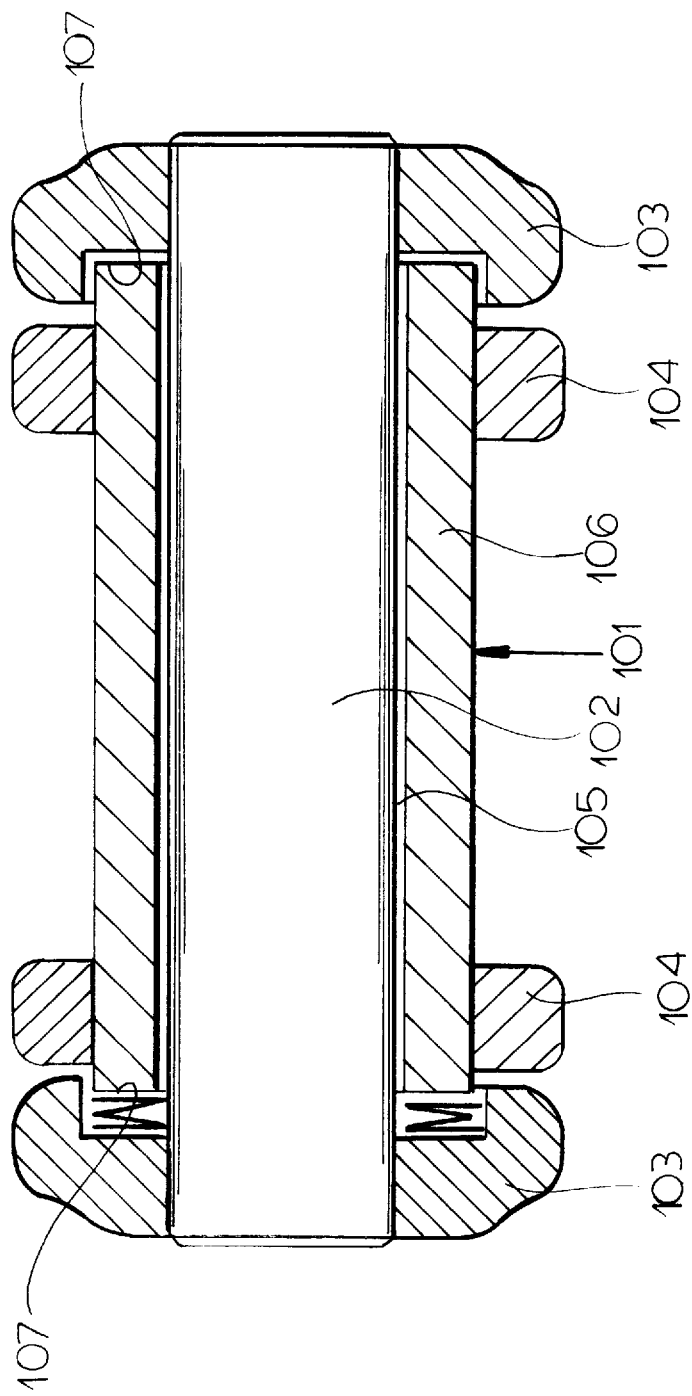
FIGS. 6 to 10 are sectional views of other chain links in crawler chains.
Figure 7:
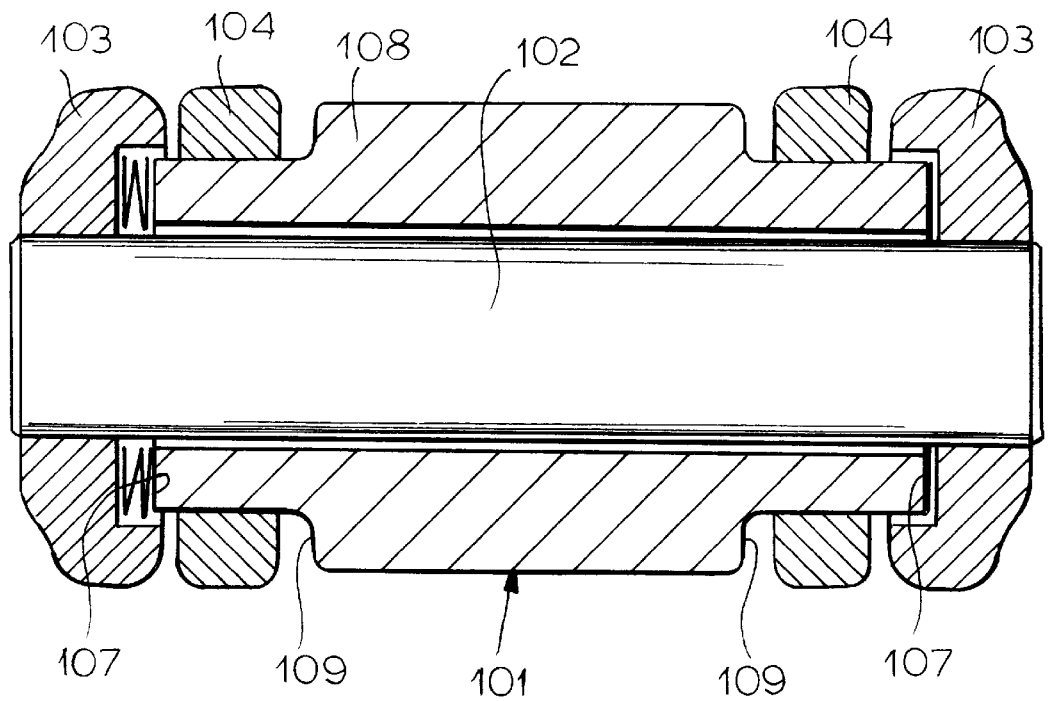

In the drawing FIGS. 6 to 10 the chain link of a crawler chain for chain-driven vehicles is shown, which consists of a chain bushing 101, a chain bolt 102 and chain links 103, 104, whereby the inner chain link ends of the chain links 104 have holes and are pressed onto the chain bushing 101 as shown in FIGS. 6 and 7, while the outer chain link ends of the chain links 103, although likewise perforated, are pressed onto the chain bolt ends of the chain bolt 102 projecting beyond the bushing 101 (embodiment of FIGS. 6 and 7).

In the embodiment of FIG. 6 the surfaces (inner 105 and outer 106) as well as the frontal surfaces 107 of the bushing 101 are built and machined corresponding to the demands made on the materials mentioned with regard to the wear behavior and the realization of a press fit. However the bushing is preferably not machined, particularly in the tooth meshing area, as well as optionally inside the bore, as well as on the other frontal surfaces.

In the embodiment of FIG. 7 the bushing 101 is a pivot bushing, whereby a pivot 108 is provided on the bushing 101. The pivot 108 is constructively laid out in such a manner that, by taking into consideration the design of the chain-driving wheel and the idler of a chain drive, respectively at the chain guide, the bushing diameter corresponds to the optimal strength requirements regarding the use of the materials indicated in the main claim. With regard to the requirements of the manufacturing processes used according to the invention and to the materials, in the transition area between the press area of the bushing 101 and the pivot 108 the radii 109 are designed so that an optimal strength geometry is achieved. Preferably the radius in this area ranges between 3 and 8 mm.

Figure 8:
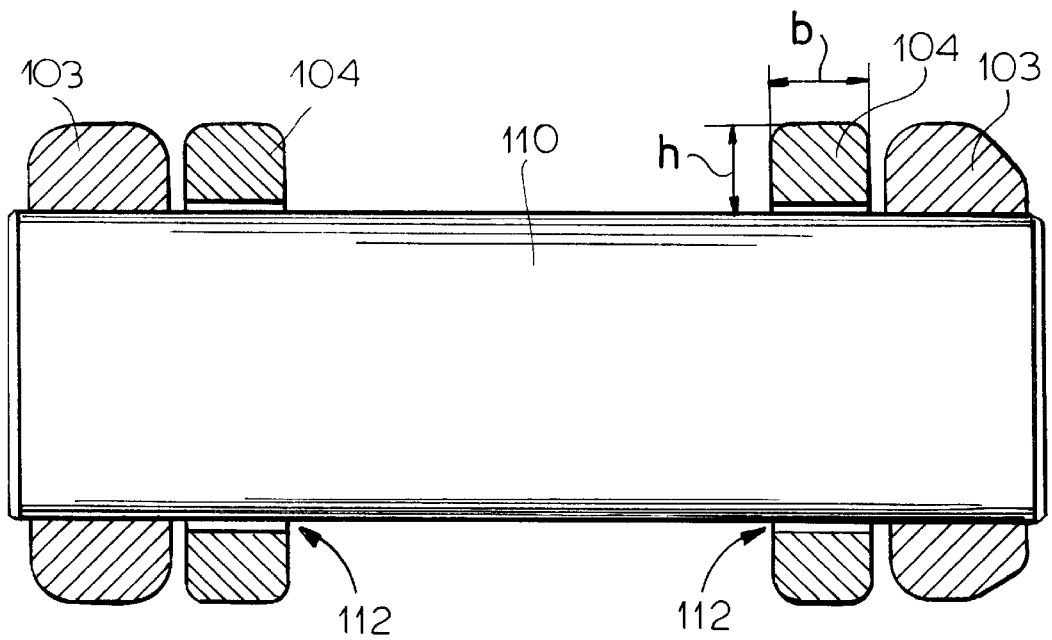
Figure 9:
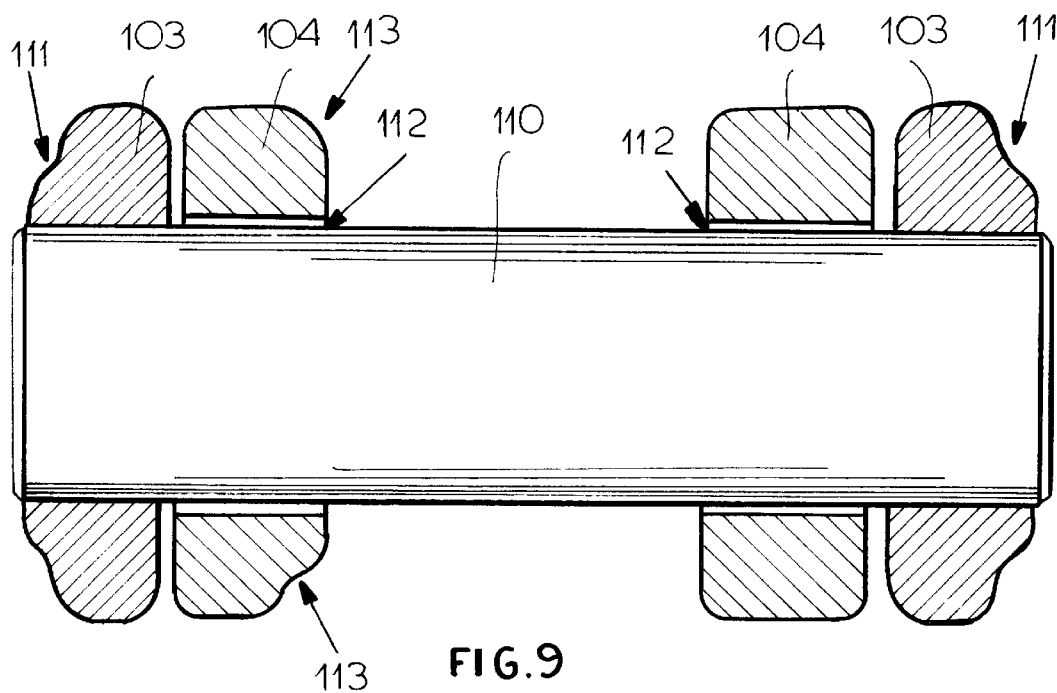
Figure 10:
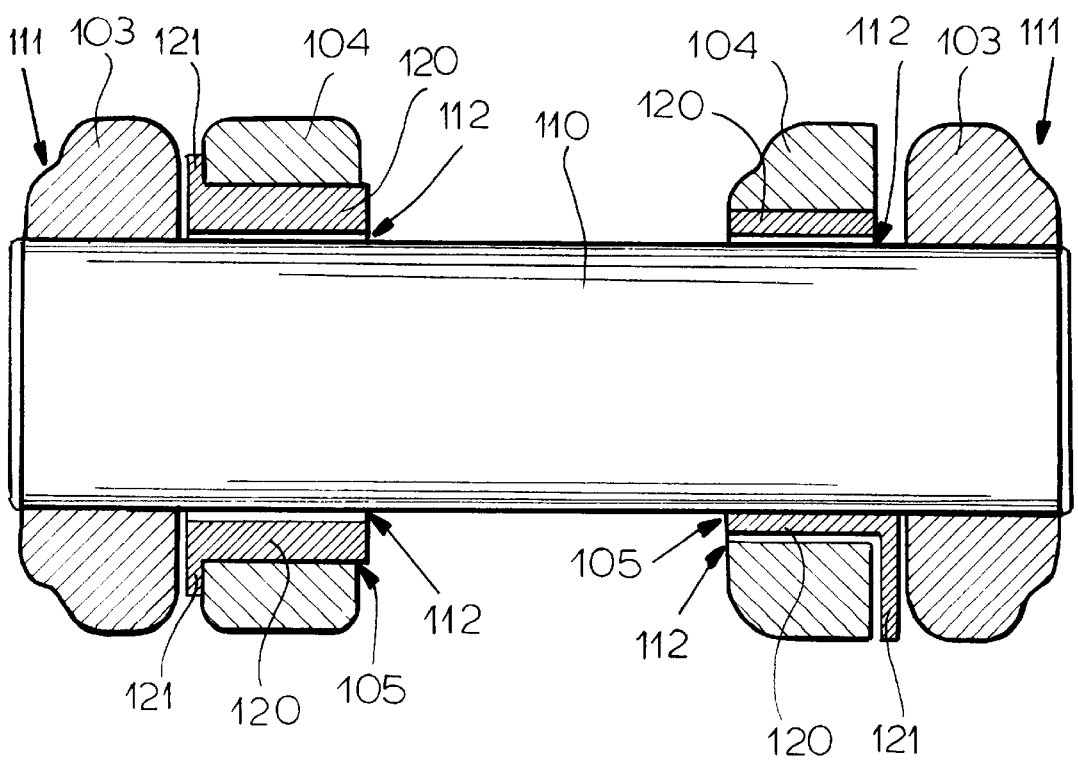
Figure 12:
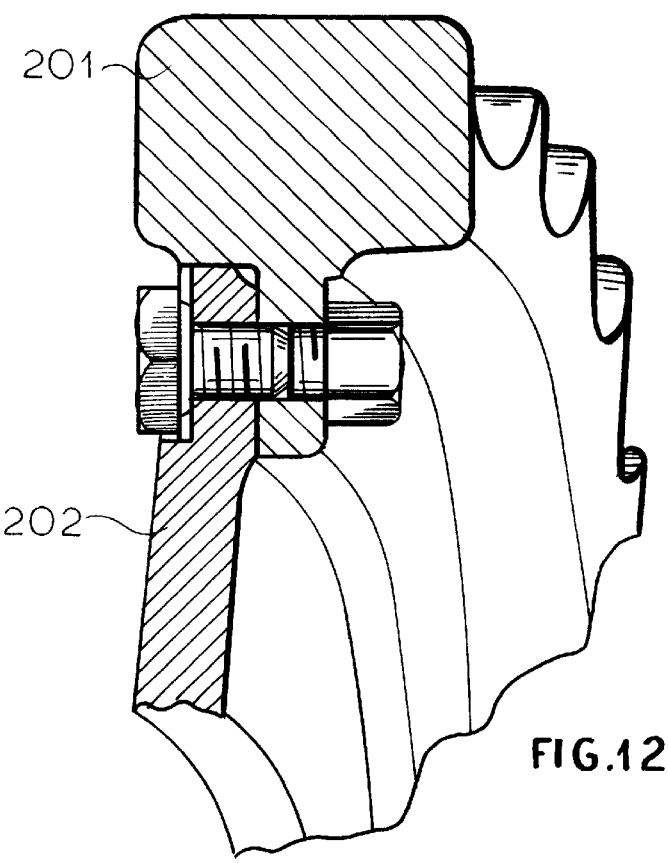
FIG. 12 is a perspective partial section of a variant of the driving wheel segment.

In the embodiments according to FIGS. 8 to 10 the chain link is built so that the bolt and the bushing are quasi joined into a compact bolt 110. This compact bolt 110 can be made of steel, but preferably it consists of the materials mentioned. The hinging is made possible by a loose fit between the eye of the chain link 104 located on the inside of the chain link assembly and the compact bolt 110. The press fit between the eye of the chain link 103 located on the outside of the chain link assembly and the compact bolt 110 is performed so that the diameter proportions correspond to the requirements resulting from the use of the materials of the invention and that the diameter of the entire bolt is derived in the generic manner from the strength requirements for the use of the materials according to the main claim. The contour 111 of the outer chain link 103 is purposely selected for the press fit, so that, by considering the demands made by the materials on the press fit, an optimal contour geometry results and that between the eye of chain link 103 and the compact bolt 110 a surface pressure is generated, which makes possible a frictional transmission of the longitudinal forces and the torque without additional safety measures against displacement and twisting.

The dimensioning of the clearance fit 112 between the eye of the inner chain link 104 and the compact bolt 110 is selected so that a hinging is easily possible, but that at the same time the annular material of the link eye corresponds in diameter, which means in relation to the height h, to the strength requirements of the chain and is executed in its width b so that already due to the use of the materials according to the main claim of the application, respectively due to the special processing, the wear between the link eye 104 and the compact bolt 110 is optimized in such a manner that this wear is not greater than the wear between driving wheel tooth and compact bolt 110, in relation to a sufficient strength of the compact bolt for the generic use.

The contour of the inner chain link 104 can also be designed for optimized wear and optimized material. In the embodiment of FIG. 10 the compact bolt 110 is made of metal or preferably of ceramic.

A ring 120 is arranged between the inner link 104 and the compact bolt 110, whereby either a press fit is created between the link eye of the inner link 104 and the ring 120, as seen in FIG. 10 top left and right, or a press fit between the compact bolt 110 and the ring 120 is created, as shown in the drawing FIG. 10, bottom right. Additionally the ring can also have a collar 121, as shown in FIG. 10. The collar serves for insuring the distance for the hinge gap, as a mounting aid and as a wear-reducing element between the neighboring link eyes.

Figure 13:
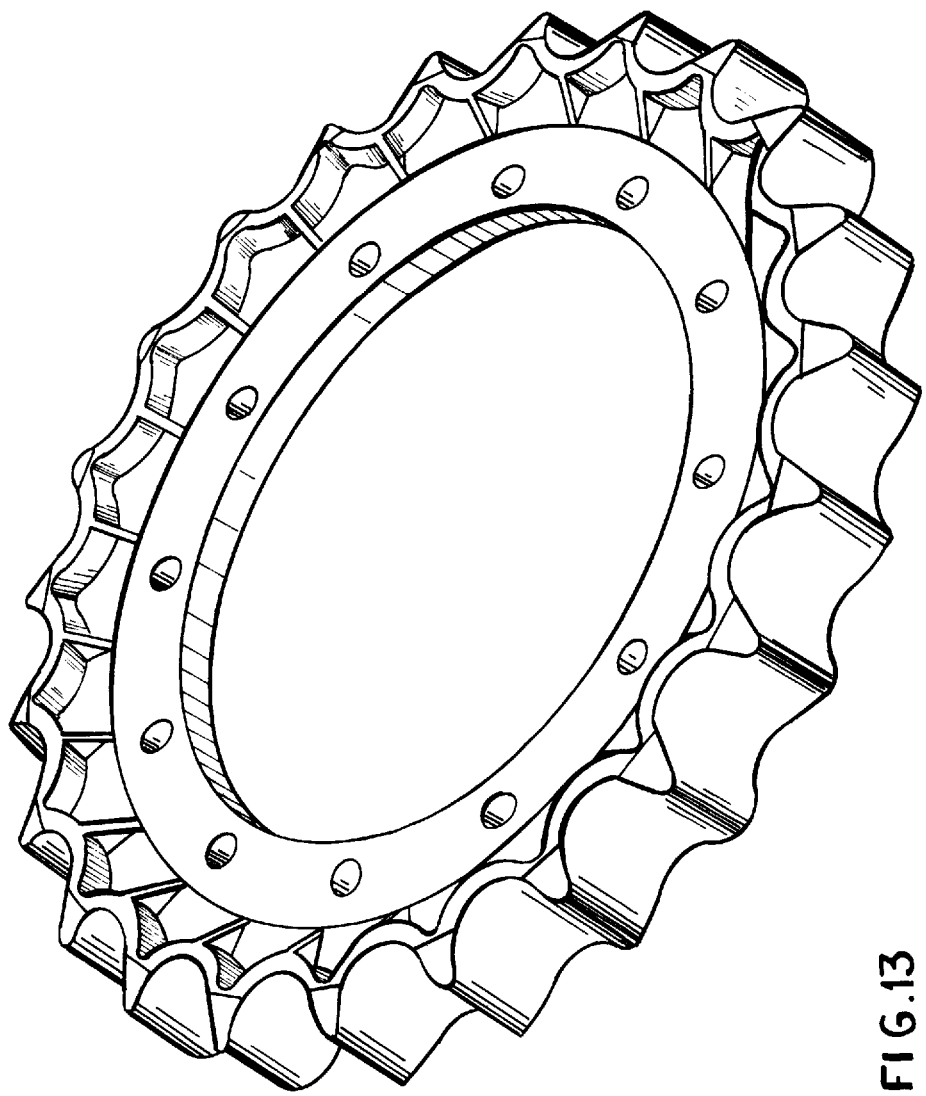
FIG. 13 is a perspective end view of another drive wheel.
Figure 14:
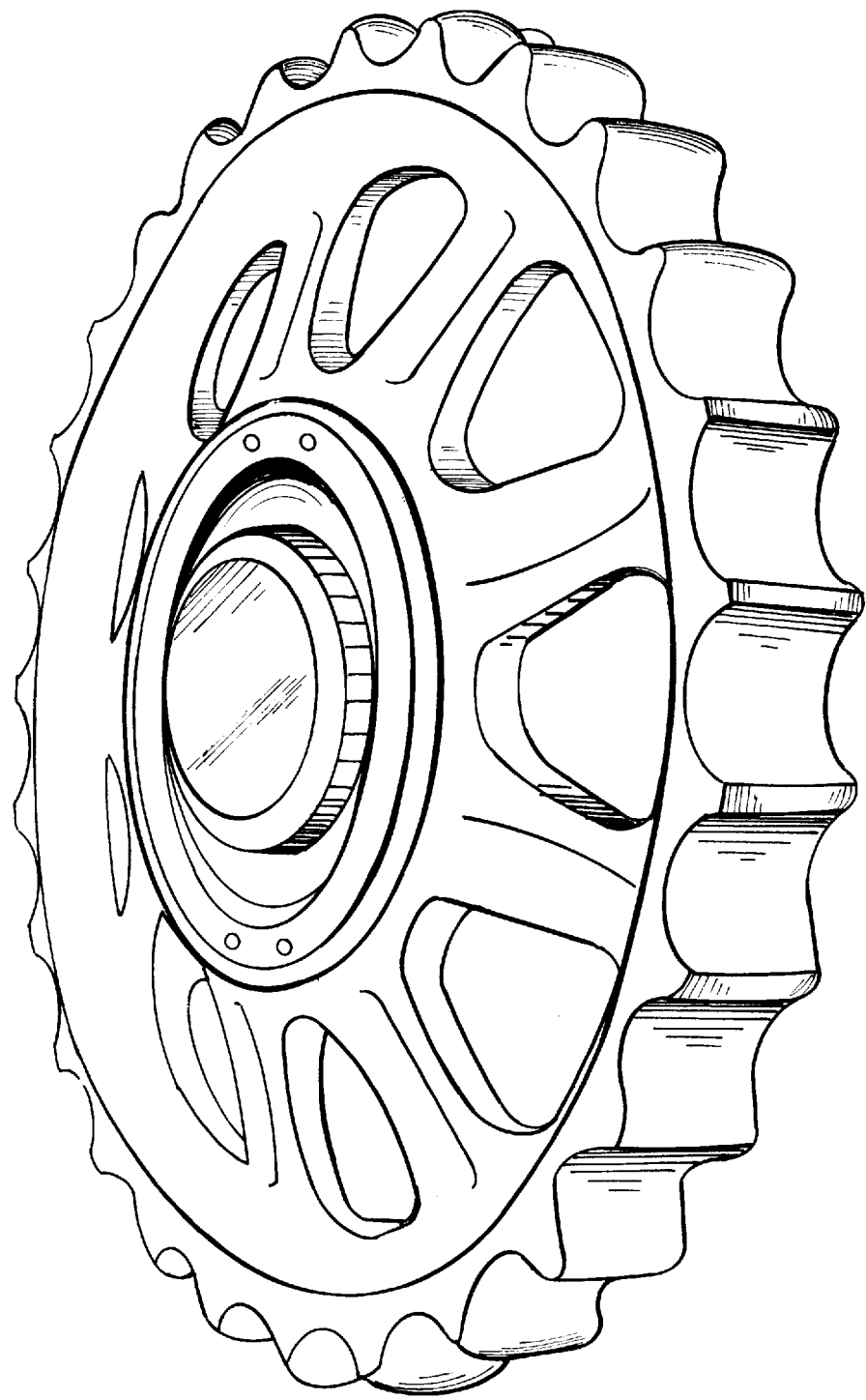
FIG. 14 is another perspective view of a drive wheel.
Figure 15:
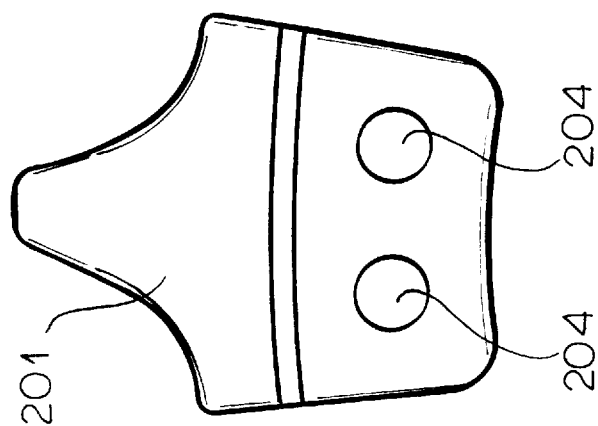

In the embodiment according to FIG. 11, the driving wheel segments 201 are screwed onto a driving wheel base disk 202 which is connected (at 203) with the transmission shaft, respectively the driving shaft. It is also possible to mount complete driving wheel rims 201 on a driving wheel base disk 202 and to fasten them to the latter by screws. Such a driving wheel rim is shown in FIG. 13. Other embodiments are also possible, wherein the entire driving wheels are made in one piece, as shown in FIG. 14. In all embodiments it is advantageous to select the materials and design of the invention. In order to adapt the construction of the individual parts of the drive to the materials preferred by the invention, constructive modifications are preferred and make sense for improving the utilization. For instance in FIG. 15 a driving wheel segment 201 is shown, which contrary to the embodiments common to the state of the art, has only a single tooth. On this single-toothed segment there are two bores 204 for fastening the segment on a driving wheel base disk 202.

Figure 16:
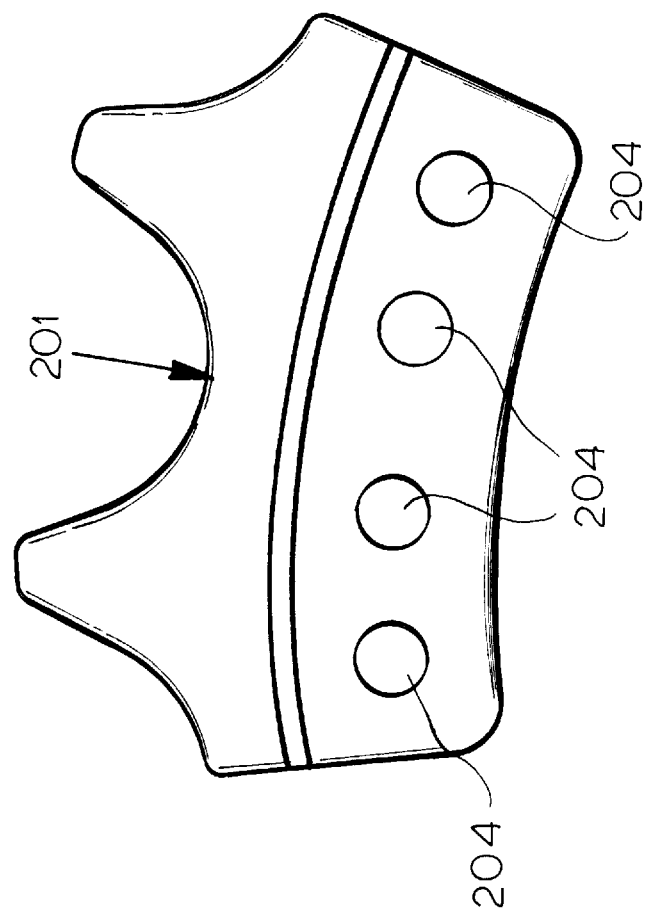

As shown in FIG. 16, the driving wheel segment 201 can also have two or three teeth, whereby to each tooth two fastening bores 204 are assigned, which are located radially inward in relation to the segment.

Figure 17:
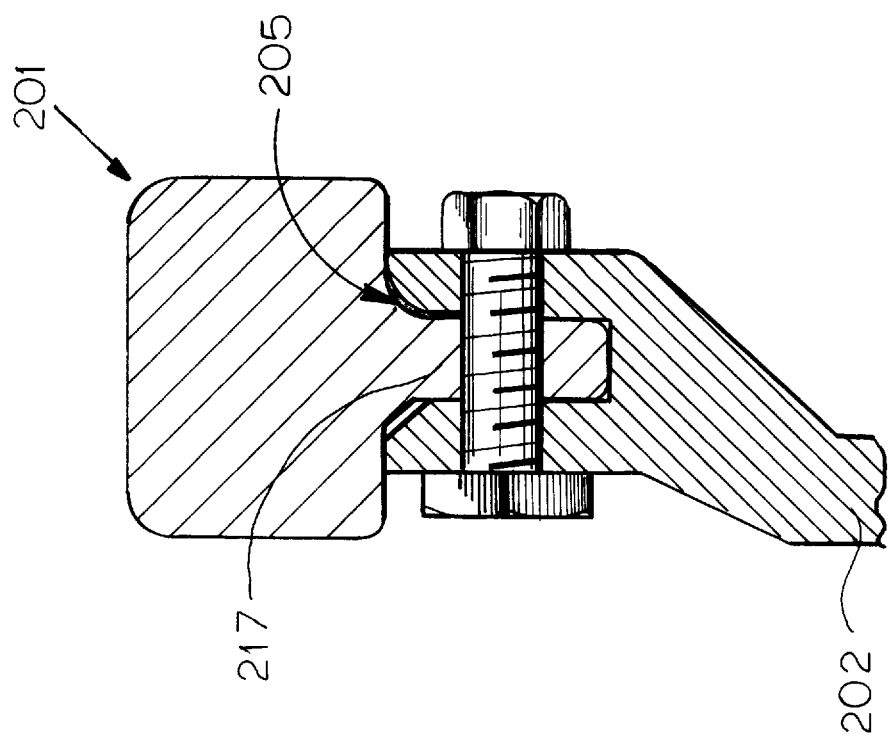

In FIG. 17 for instance a driving wheel segment 201 with a central connection pin 217 is shown. In this embodiment a preferred connection configuration, which has been modified with respect to the common driving wheel segments, is provided, namely in the form of a central connection pin 217 at each driving wheel segment 201. This way an increase in strength is achieved. Preferably roundings 205 in a preferred radius of 3 to 8 mm are advantageous for reasons specific to the material in the transition areas from tooth to connection pin 217. It is also preferred to produce the reverse geometric shape on the connection element of the driving wheel base disk 202.

Figures 19A, 19B:
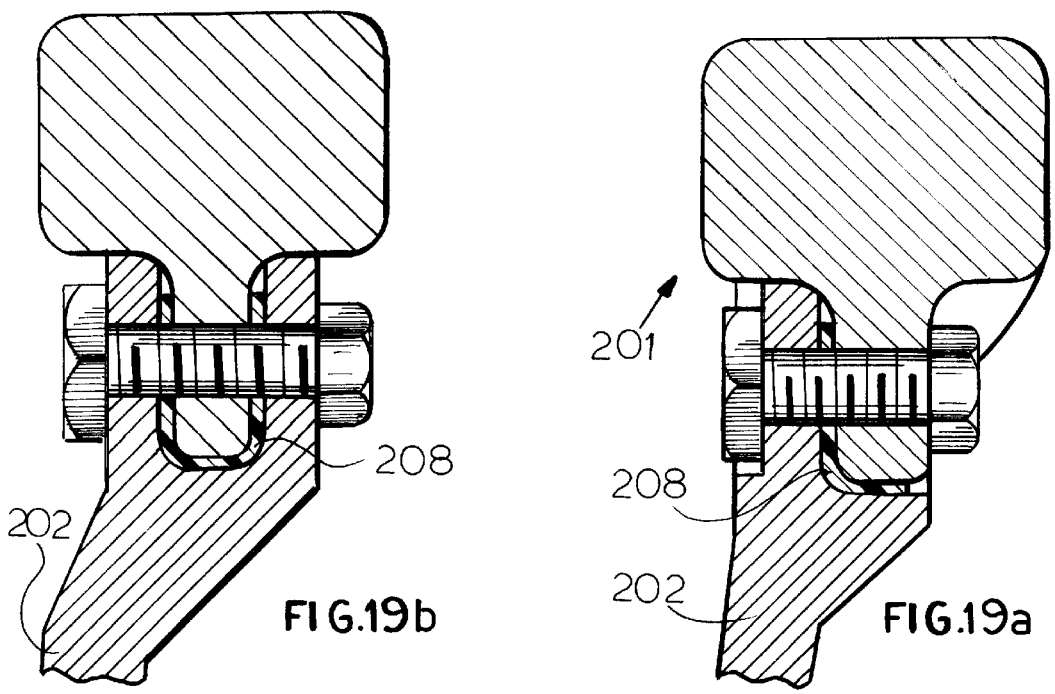
FIGS. 15–25C are various detail views in perspective elevation and section for driving wheels.
Figure 18:
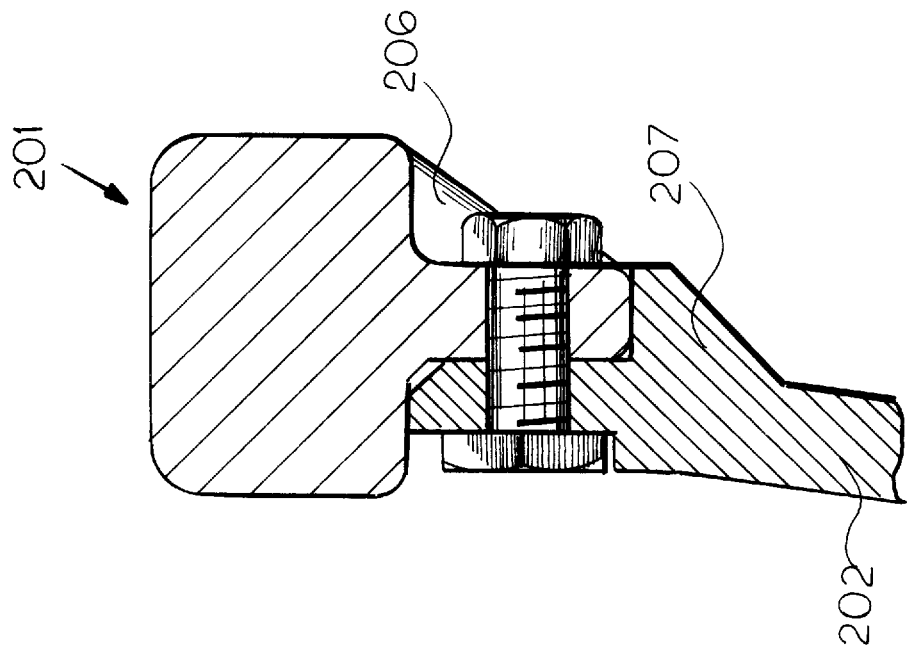

In order to meet the requirements specific to the material, on the toothed segments 201 tooth reinforcements 206 are additionally provided, as can be seen for instance in FIG. 18. A special constructive layout of the connection element on the driving wheel base disk 202 (e.g. flange disk, screw-on rim, or welding ring) is provided. A special contribution to the strength of the driving wheel segment 201 of the materials according to the invention is made by the a constructive peculiarity of the driving wheel base disk 202, in that there reinforcements 207 are provided which insure the strength and support the driving segment 201. In a further embodiment, for instance in the embodiments according to FIGS. 19a and 19b, in order to dampen impact loads a ductile intermediate layer 208 is inserted directly in the connection between driving wheel segment 201 and the driving wheel base disk 202, which is applied directly to the driving wheel segment 201, respectively the driving wheel base disk 202, and which consists of materials proposed by the invention with a modified composition, but can also consist of other ductile materials. The ductile intermediate layer can also consist of an intermediate disk, i.e. not be applied directly to the driving segment or the driving wheel base disk.

Figure 20:
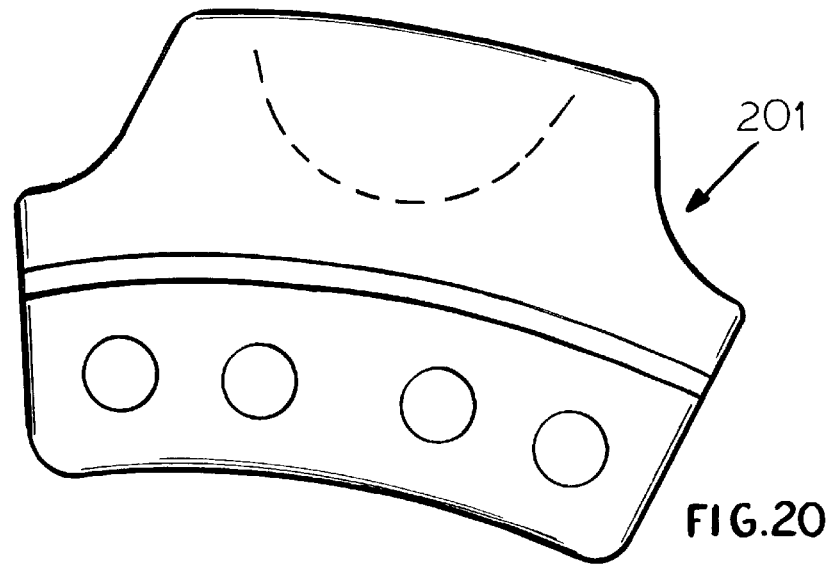

In the embodiment according to FIG. 20 the actual tooth of the toothed segment 201 is broadened, so that the tooth practically spans a width which was covered by two teeth in the known common construction embodiment. This configuration is preferred and useful based on the choice of materials according to the invention.

Figure 21:
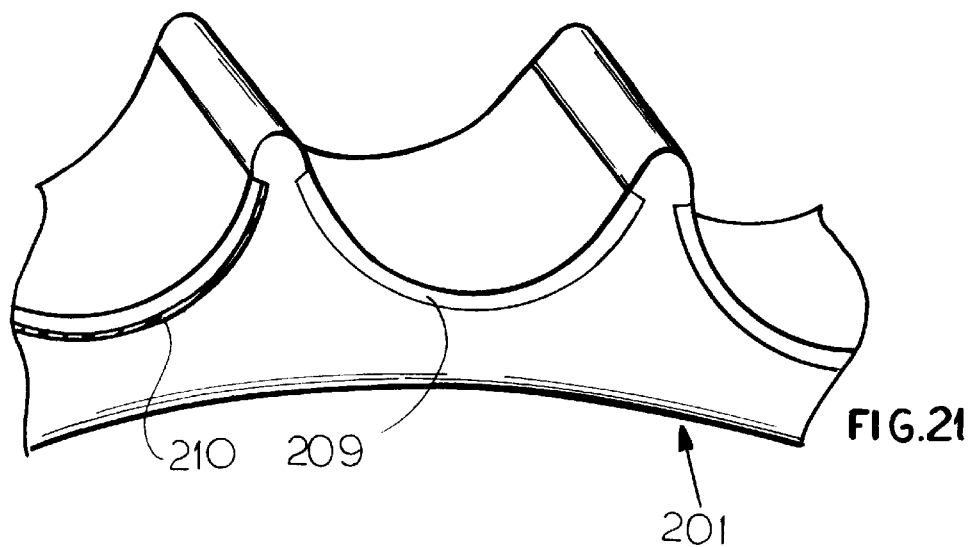
Figure 22:
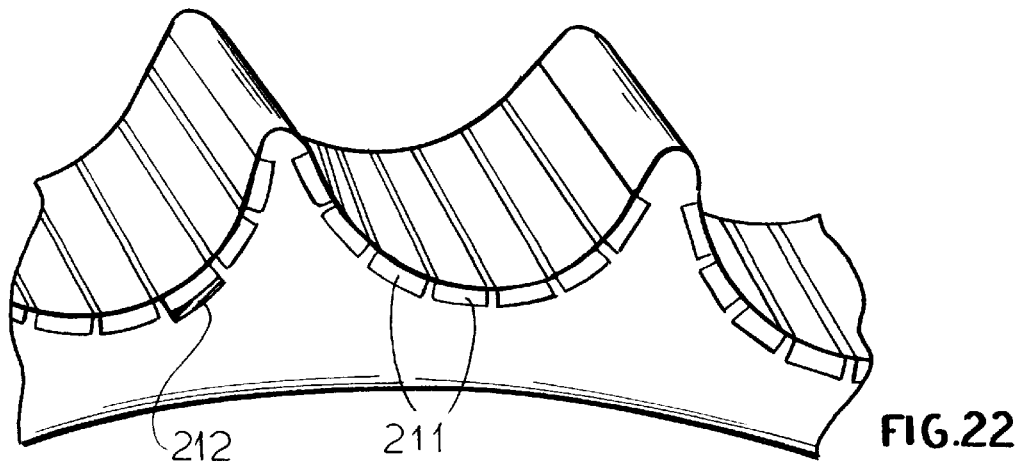

The use of the material of the invention for the teeth of the toothed segment 201 can also take place in another way. This is closer explained with the aid of the following figures. There the tooth is made of a steel or cast iron substrate body of the driving wheel segment 201. In the embodiment according to FIGS. 21 a tooth syncline insert is provided. Thereby in the tooth syncline of the driving rim, respectively of the driving segment 201, a shell 209 made of the material preferred by the invention is provided, which is advantageously inserted and fixed by casting, soldering, gluing or other methods. Optionally a ductile intermediate layer 210 can be provided between the shell 209 and the substrate body of the tooth syncline. The shell 209 can reach up to the frontal face of the tooth or can end before that. It can also be laterally surrounded by metal. In the embodiment according to FIG. 22 the tooth syncline insert can be made in several parts. Basically it is a similar or identical manufacturing principle like the one of the ceramic insert made in one piece according to FIG. 21. But there are multipart material inserts 211 in the tooth syncline, preferably in the form of strips which are arranged transversely to the driving tooth and are made with or without a ductile intermediate layer 212.

As a result of this construction variant the formation of very compact bodies made of the mentioned materials of the invention is avoided, thereby lowering their breaking risk, since the strips are more or less independently subjected to load.

Figure 23:
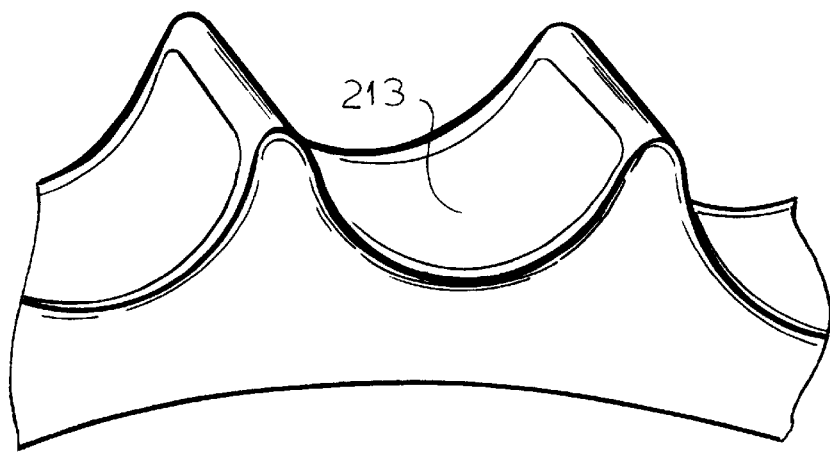
Figure 24A:
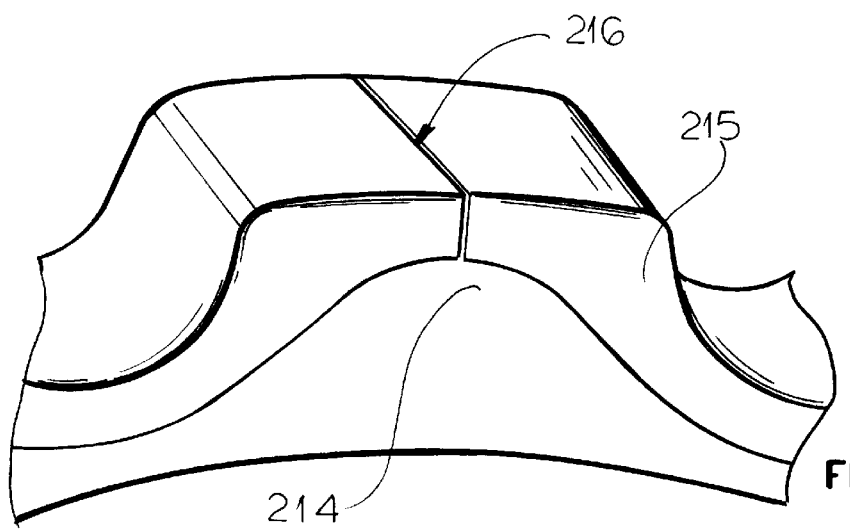
Figure 24B:
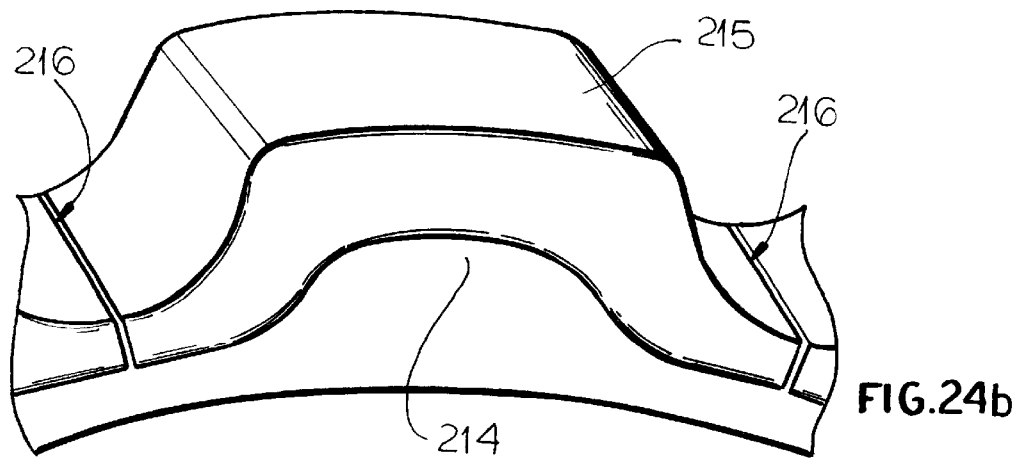

In the embodiment of FIG. 23 the tooth syncline is coated with the mentioned preferred materials, preferably by thermal spraying. Therefore in the tooth syncline a bed is prepared for receiving the coating. The coating 213 can consist of several partial coatings, whose ductility increases radially inward, in order to counteract the risk of breaking under high loads. A further variant is shown in FIGS. 24a and 24b. Thereby the driving segment is made of steel, cast iron or also of the materials preferred by the invention. It is manufactured in the following manner: a kind of tooth stump 214 is formed and a cap 215 of the materials preferred by the invention is positioned over it. For reasons of strength the tooth gap of the driving wheel with reference to the driving wheel segment can not be filled with the mentioned materials. The connection between the tooth cap 215 and the tooth stump 214 is achieved through casting, gluing, soldering or similar methods. The partition 216 of the tooth cap 215 lies at the tooth tip (FIG. 24a) or preferably at the tooth base (24b), since in this case in addition to the tooth flanks, the frontal tooth faces are also very wear-resistant.

Figure 25C:
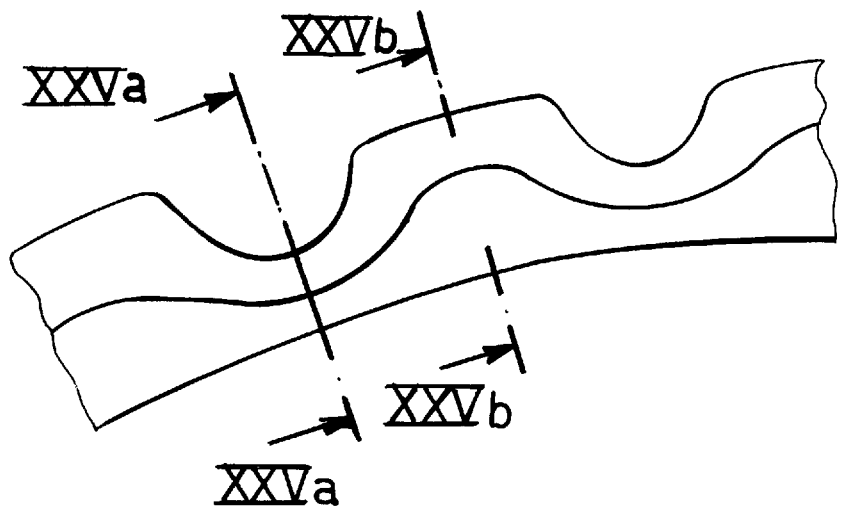
Figure 25A:
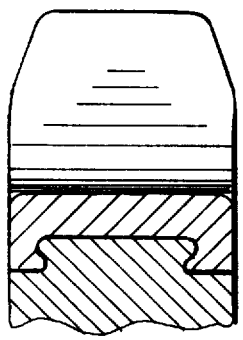
Figure 25B:
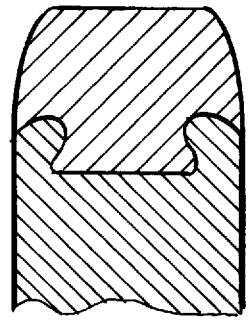

A further variant is shown in FIGS. 25a to 25c. There a special molding of the elements is provided, which improves and facilitates the casting of the tooth cap or the like of the mentioned materials onto the driving wheel segment, respectively the driving wheels. The cross section geometry in the connection area is approximately swallow-tail shaped. In the manufacturing process these molded elements are either molded on the existing tooth portion made of the mentioned materials and are surrounded by the cast product during the casting of the driving wheel segment or driving wheel (FIG. 25b) or the negative of the molded part is worked into the existing tooth portion made of the mentioned materials and filled by the cast product (25a). The latter has the advantage that the connection with a special geometric shape is protected against lateral wear by the surrounding wear-resistant part made of the mentioned material. In FIG. 25c the section points A and B are shown in relation to the sectional views in FIGS. 25a and 25b.

Figure 26:
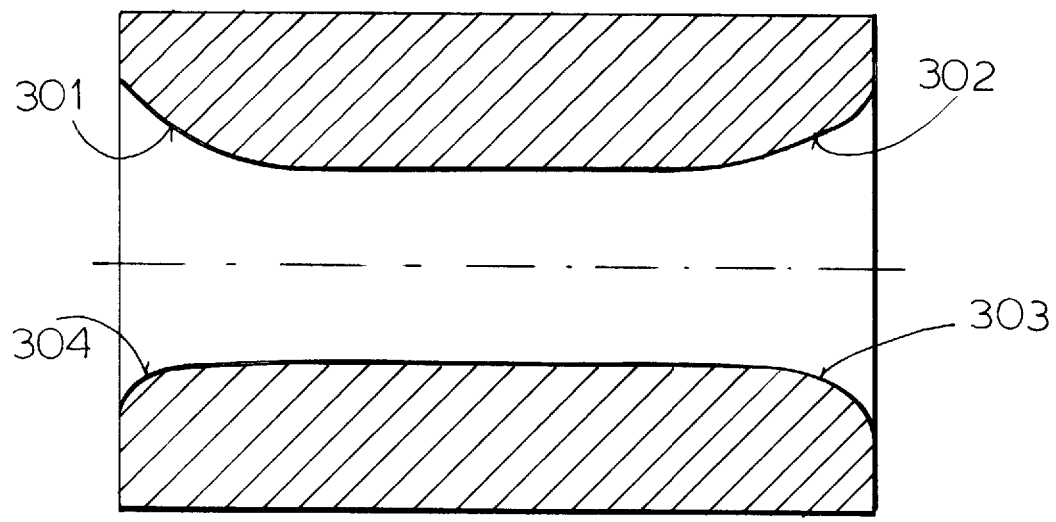
FIG. 26 is a diagrammatic section of a bushing built according to the invention.
Figure 27:
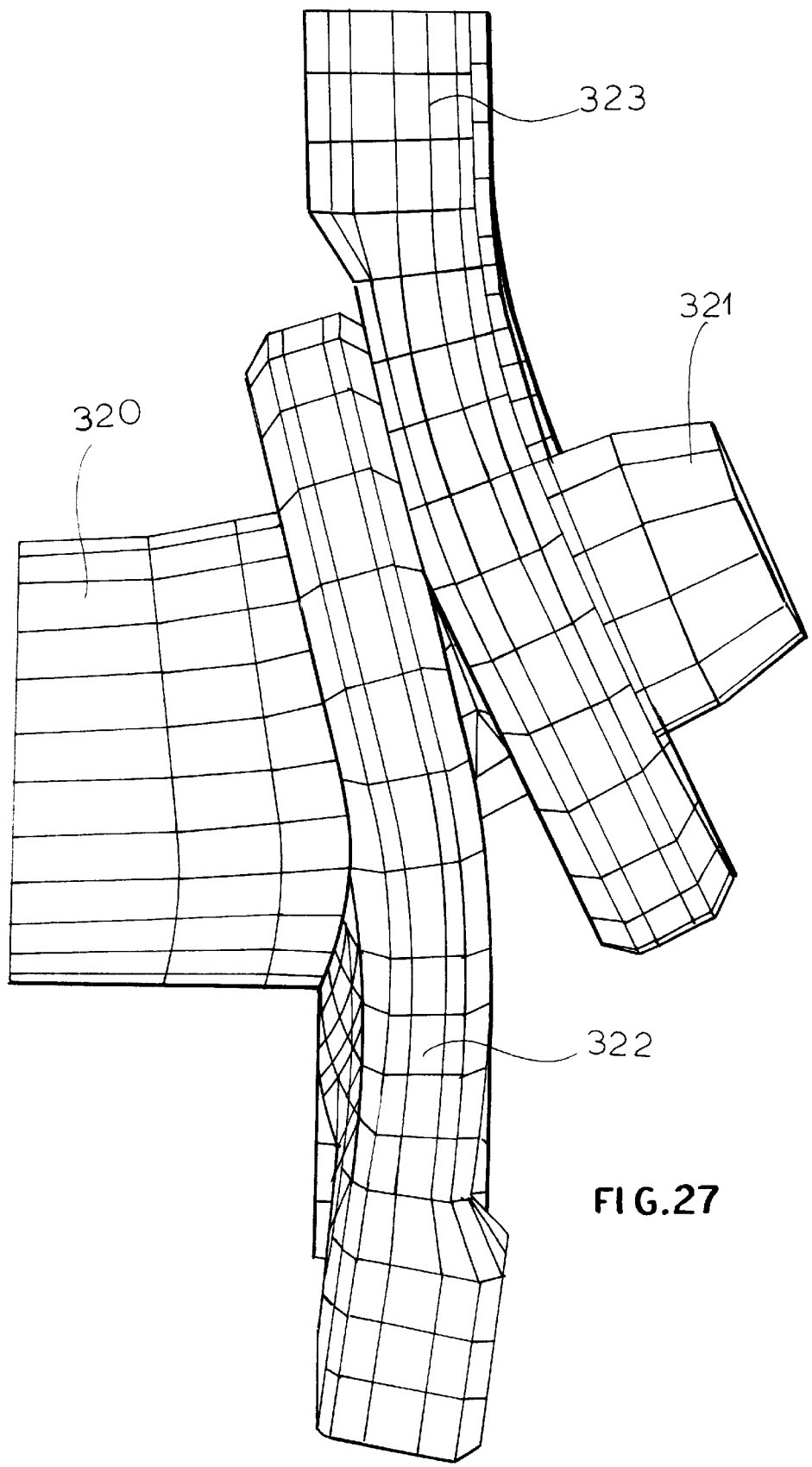
FIG. 27 is a diagram of the bending under load of bolts and bushings as well as chain links which occurs in practice in crawler chains.

FIG. 26 shows a chain bushing in section, whereby in the inner area of the bushing, i.e. in the hinging area of the outer bolt contour of the bolt in the bushing and the inner bushing contour (inner bushing surface), the construction is laid out in such a way that the inner bushing contour according to FIG. 26 comes close to the bolt contour which results from the bending of the bolt when the chain is under load, as shown in FIG. 27.

Figure 28:
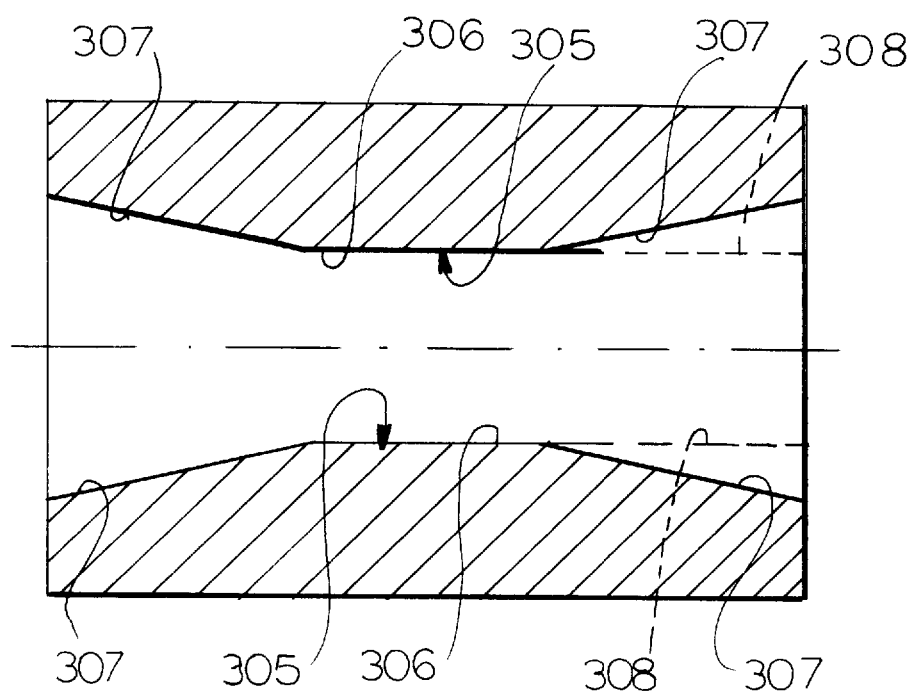
FIG. 28 is a view of a bushing according to the state of the art mentioned in the specification.

Thereby the inner area of the bushing, in relation to the extension of the inner contour or also in relation to the area from the bushing middle up to the frontal bushing sides, is a constant nonlinear function, preferably coming close to the function determined by the bending line of the bolt, whereby the contour can have a logarithmic function (at 1 in FIG. 26), a potential function (at 3 in FIG. 26), an exponential function (at 4 in FIG. 26) or also a compound curve shape, as shown at 2 in FIG. 26, whereby there a flatter radius R1 continues with a stronger curved radius R2 at the frontal bushing side. In FIG. 28 a steel bushing known to the state of the art is shown, whereby the inner contour 305 of the bushing is executed so that a deviation from the originally straight portion 306 occurs, and this deviation itself continues to run as a straight line 307. When the link is pressed onto it, again a basically straight inner contour results due to the inwardly transmitted effects of the press fit, which is indicated in FIG. 28 by the broken straight line 308.

In FIG. 27 the hinging point of a crawler chain is shown, whereby 320 marks the chain bushing, 321 the chain bolt, 322 the inner chain link and 322 the outer chain link. In this drawing figure the bending behavior of the interengaged parts is schematically shown.

All novel individual features or combined features disclosed in the specification and/or the drawing are considered essential to the invention.

What is claimed is:

1. A track system for a tracked vehicle, the track system comprising:
    a crawler chain comprised of:
        a bolt having opposite ends,
        a bushing on the bolt between the bolt ends and wholly composed of silicon nitride material with less than 15% of sintering additives and a Weibull modulus in excess of 20 or of zirconium oxide,
        a pair of inner links spaced apart by the region and having bores receiving the bushing adjacent the bolt ends, and
        a pair of outer links flanking the pair of inner links and having bores receiving the bolt ends, the links of one of the pairs pivoting relative to the links of the other pair about the bolt; and
    a driving sprocket wheel engaging the chain for driving same, the sprocket wheel having teeth engaging the bushing and formed of a material different from that of the bushing.

2. The track system for a tracked vehicle as defined in claim 1 wherein the inner links engage the bushing with a press fit maintaining an elastic deformation pressure against the bushing, the bushing having a lower coefficient of expansion than the inner links, the inner links being composed of steel.

3. The track system for a tracked vehicle as defined in claim 1 wherein:
    the bolt has a blind axial recess filled with a lubricant and a radial bore opening from the recess between the bolt and the bushing,
    the crawler chain comprises sealing means between a respective end of the bushing and a face of a respective one of the outer links juxtaposed therewith, the sealing means being one of the following:
        an elastic sealing ring engaging the respective end of the bushing and the respective outer-link face, and a support ring radially inwardly of the sealing ring and composed of the material consisting of silicon nitride material with less than 15% of sintering additives or zirconium oxide, or
        a sliding ring molded onto the end of the bushing, and an elastic ring on the face of the respective outer link and pressing against the sliding ring.

4. The track system for a tracked vehicle as defined in claim 1 wherein the bolt is composed of the material consisting of silicon nitride material with less than 15% of sintering additives or zirconium oxide.

5. The track system for a tracked vehicle as defined in claim 1 wherein the outer links engage the bolt with a press fit maintaining an elastic deformation pressure against the bolt, the bolt having a lower coefficient of expansion than the outer links, the outer links being composed of steel.

6. The track system for a tracked vehicle as defined in claim 1 wherein the material consisting of silicon nitride with less than 15% of sintering additives or zirconium oxide has a fracture growth in a subcritical range, a fracture toughness of less than 20 MPa$\sqrt{m}$.

7. The track system for a tracked vehicle as defined in claim 1 wherein the bushing has a surface engaged by the wheel with a radius of 3 mm and surfaces engaged by the inner links of with radii of 8 mm.

8. The track system for a tracked vehicle as defined in claim 1 wherein the pin assembly comprises a bolt formed as a single part with the bushing and wholly composed of the material consisting of silicon nitride with less than 15% of sintering additives or zirconium oxide, and with a fracture growth in a subcritical range, a fracture toughness of less than 20 Mpa$\sqrt{m}$ with a Weibull modulus in excess of 20, the inner links having clearance fits on the bolt.

9. The track system for a tracked vehicle as defined in claim 8 wherein the outer links engage the bolt with a press fit maintaining an elastic deformation pressure against the bolt, the bolt having a lower coefficient of expansion than the outer links, the outer links being composed of steel.

10. The track system for a tracked vehicle as defined in claim 1 wherein the bushing is formed by sleeves press fitted into the inner links and surrounding the bolt with a clearance fit, the sleeves being wholly composed of the material consisting of silicon nitride with less than 15% of sintering additives or zirconium oxide, and with a fracture growth in a subcritical range, a fracture toughness of less than 20 MPa$\sqrt{m}$ and high homogeneity with a Weibull modulus in excess of 20, each of the sleeves having a collar juxtaposed with a face of a respective outer link.

11. The track system for a tracked vehicle as defined in claim 1 wherein the bushing is formed by sleeves press fitted onto the bolt and received in the bores of the inner links with a clearance fit, the sleeves being wholly composed of the material consisting of silicon nitride with less than 15% of sintering additives or zirconium oxide, and with a fracture growth in a subcritical range, a fracture toughness of less than 20 MPa$\sqrt{m}$ and high homogeneity with a Weibull modulus in excess of 20, each of the sleeves having a collar juxtaposed with a face of a respective outer link.

12. The track system for a tracked vehicle as defined in claim 1 wherein the wheel is wholly composed of the material consisting of silicon nitride material with less than 15% of sintering additives or zirconium oxide, and with a fracture growth in a subcritical range, a fracture resistance not less than 5 MPa$\sqrt{m}$ and high homogeneity with a Weibull modulus in excess of 20.

* * * * *